US006879699B1

(12) United States Patent
Logan

(10) Patent No.: US 6,879,699 B1
(45) Date of Patent: Apr. 12, 2005

(54) HEAD WORN ENTERTAINMENT AND/OR COMMUNICATION DEVICE

(75) Inventor: Ty Logan, 4 Beattie Street, Balmain, New South Wales 2041 (AU)

(73) Assignee: Ty Logan, New South Wales (AU)

( * ) Notice: Subject to any disclaimer, the term of this patent is extended or adjusted under 35 U.S.C. 154(b) by 0 days.

(21) Appl. No.: 09/700,856

(22) PCT Filed: May 20, 1999

(86) PCT No.: PCT/AU99/00380

§ 371 (c)(1),
(2), (4) Date: Feb. 5, 2001

(87) PCT Pub. No.: WO99/60816

PCT Pub. Date: Nov. 25, 1999

(30) Foreign Application Priority Data

May 20, 1998 (AU) .......................................... 67977/98

(51) Int. Cl.[7] .................................................. H04R 9/08

(52) U.S. Cl. ....................... 381/367; 381/376; 381/379; 381/381

(58) Field of Search ................................ 381/312, 314, 381/315, 322, 370, 374, 377, 379, 376, 378, 361, 362, 363, 364, 367, 368, 381, 383, 380; 181/129, 135

(56) References Cited

U.S. PATENT DOCUMENTS

| | | | | |
|---|---|---|---|---|
| 4,335,281 A | | 6/1982 | Scott et al. | |
| 4,682,363 A | | 7/1987 | Goldfarb et al. | 381/74 |
| 4,893,344 A | | 1/1990 | Tragardh et al. | |
| 5,412,736 A | * | 5/1995 | Keliiliki | 381/370 |
| 5,537,667 A | | 7/1996 | Kenning et al. | 381/88 |
| 5,610,988 A | * | 3/1997 | Miyahara | 381/312 |
| 5,771,441 A | * | 6/1998 | Altstatt | 381/314 |
| 5,835,610 A | * | 11/1998 | Ishige et al. | 381/315 |

FOREIGN PATENT DOCUMENTS

| | | |
|---|---|---|
| GB | 2226931 | 1/1989 |
| WO | PCT/US95/08140 | 6/1995 |

* cited by examiner

*Primary Examiner*—Rexford Barnie
(74) *Attorney, Agent, or Firm*—Paul & Paul

(57) ABSTRACT

A head worn entertainment and communication device (10, 110) including at least a first ear assembly (11, 112) which further includes a transducer (19, 119) in communication with a radio receiver housed within an equipment module (27, 127). In particular forms the ear assembly includes a lower limb (20, 120) and an upper limb (22, 122) defining an ear containing space (23, 123) therebetween. In other particular forms a first ear assembly (11) is interconnected with a second ear assembly (12) by means of an interconnect device (13).

28 Claims, 5 Drawing Sheets

HEAD WORN ENTERTAINMENT AND/OR COMMUNICATION DEVICE

The present invention relates to a head worn entertainment and communication device and, more particularly, to such a device adapted to be worn whilst engaging in swimming actvities such as doing laps of a pool and the like.

BACKGROUND

There are occasions when it would be desirable to be able to listen to the radio or other form of audio communication whilst engaged in swimming activities. In the case of competition swimmers they often spend long hours doing laps of pools and it would be advantageous, for example, to listen to the radio to help while the time away.

It is known to provide a radio module which can be strapped to the body or contained in clothing and which is connected by a cable to an ear piece. These forms of body worn communication devices are not suitable for use in the water and, even if waterproofed, would tend not to stay in place during vigorous swimming activity such as doing laps of a pool.

It is an object of the present invention to provide a swimmers head worm entertainment and communication device which addresses one or more of the abovementioned problems and needs.

BRIEF DESCRIPTION OF INVENTION

In a first aspect the present invention provides a head worn entertainment and/or communication device comprising a first ear assembly, a transducer for converting an electrical signal to an auditory signal, a radio receiver in communication with the transducer and wherein the first ear assembly comprises an upper limb and a lower limb for fitment to the ear.

Preferably, the upper limb and the lower limb of the first ear assembly define an ear containing space.

In use of present invention, the first ear assembly is positioned relative to the ear such that the upper limb and lower limb extend at least partly, and preferably substantially, around the ear to thereby hold the first ear assembly in place. The transducer is preferably carried by, fixed to or formed with the first ear assembly such that the transducer is positioned within or in close proximity to the ear when the first ear assembly is fitted to the ear. Even more preferably, the transducer is positioned within an ear plug that, in use, fits inside the ear canal of the user. The transducer is most preferably supported by the first ear assembly, especially by one of the upper or lower limbs, most preferably the lower limb. The transducer and receiver may be formed as an integrated unit. This would preferably be mounted on the first ear assembly.

It is preferred that the device of the present invention further comprises a first equipment module. The first equipment module may be positioned on or carried by the first ear assembly or it may be located away from the first ear assembly. The first equipment module may contain the radio receiver therein.

In another embodiment of the present invention, the first ear assembly is connected to an interconnect device, which interconnect device is adapted to extend at least partly around the head of a user of the device. The interconnect device may comprise a first support means and a second support means connected to each other by an adjustable length means, said first and second support means being generally opposed to each other. The adjustable length means may comprise and adjustable length concertina tube. Alternatively, the adjustable length means may comprise a deformable member. The length of the deformable member be adjusted by deforming the deformable member.

The first support means preferably comprises a first rigid support. In this regard, the semi rigid support may be deformable or flexible to allow close fit to the head of a user of the device. The first support means may comprise a deformable or flexible plastics material, a wire, a deformable metal member, or the like.

Similarly, the second support means is preferably a second semi rigid support. The second support means may be deformable or flexible to allow close fit to the head of a user. The second support means preferably comprises a deformable or flexible plastics material, a wire, a deformable or flexible metal material or the like.

The second support means, in one embodiment of the invention, terminates in a stub. In this embodiment, the device of the present invention is fitted to the head of a user by placing the first ear assembly around or on one ear of the user and positioning the second support means such that it extends at least partly along the other side of the head of the user. Adjustment of the first and/or second support means and/or the adjustable length means, thereby assists in holding the device securely to the head of the user.

In a further embodiment of the present invention, the second support means has a second ear assembly connected thereto. The second ear assembly may comprise an upper limb and a lower limb for fitment to the other ear of the user. The upper and lower limbs preferably define an ear containing space. The second ear assembly may also include a transducer for converting an electrical to an auditory signal. In this regard, the transducer of the second ear means is preferably in communication with the radio receiver.

The transducer of the second ear assembly is preferably positioned at such that, in use, it is positioned within or in close proximity to the ear of the user. More preferably, the transducer of the second ear assembly is positioned within an earplug that, in use, fits inside the ear canal of the user.

The upper limb and/or the lower limb of the first and/or second ear assemblies may of adjustable shape to enable the upper and/or lower limbs to more closely conform to the ear of the user. The upper and/or lower limbs may include at least one portion of adjustable shape, such as a concertina tube portion.

The first equipment module is preferably positioned on or formed on the first support means. Cabling may extend from the first equipment module to the first ear assembly and, in embodiments that include a second ear assembly as well, such that electrical signal from the radio receiver can be transmitted to the respective transducers in the first and second ear assemblies. The cabling preferably passes through the inside of the device such that there is no external cabling. The cabling most preferably passes through the interconnect device to the first ear assembly and the second ear assembly, where provided.

The apparatus of the present invention preferably further comprises a second equipment module. The second equipment module is preferably carried by or formed with the second support means. Preferably, the second equipment module is generally opposed to the first equipment module.

The second equipment module preferably contains the battery or batteries for use in the device. Power cable(s) may extend from the second equipment module to the first equipment module. Preferably, the power cable(s) pass through the inside of the device, most preferably through the interconnect device.

In order to enable the device to be used for water sports or aquatic purposes, it is preferred that the device is essentially waterproof. In the regard, the first and second equipment modules should be waterproof. The second module may have a removable cover to allow the batteries to be changed. The removable cover is preferably fitted with a water tight seal or gasket, as will be know to those skilled in the particular art.

The transducer or transducers may be speakers. Alternatively, they may be bone conduction hearing devices, in which case they are preferably located such that, in use, they are in contact with bone behind the ear.

The device of the present invention is preferably used as part of a communication and/or entertainment system which also comprises a radio transmitter for transmitting radio signals to the radio receive. Preferably, the radio transmitter is a low powered transmitter and it may have a maximum transmission of up to 1 km, or even less. The radio transmitter may include a microphone to enable verbal communication to pass from the person using the microphone to the person wearing the device. This particularly useful in cases where swimming coaches wish to give instruction to swimmers training in the water. Alternatively, the radio transmitter may re-transmit a radio signal from a local radio station or it may receive an input signal from a tape player or CD player and transmit that signal to the radio receiver of the device. This allows the use of the device to choose his or her own music. The radio transmitter may have an input jack to facilitate the function.

BRIEF DESCRIPTION OF THE DRAWING

Embodiments of the invention will now be described with reference to the accompanying drawings wherein.

DETAILED DESCRIPTION OF PREFERRED EMBODIMENTS

Figure 1:
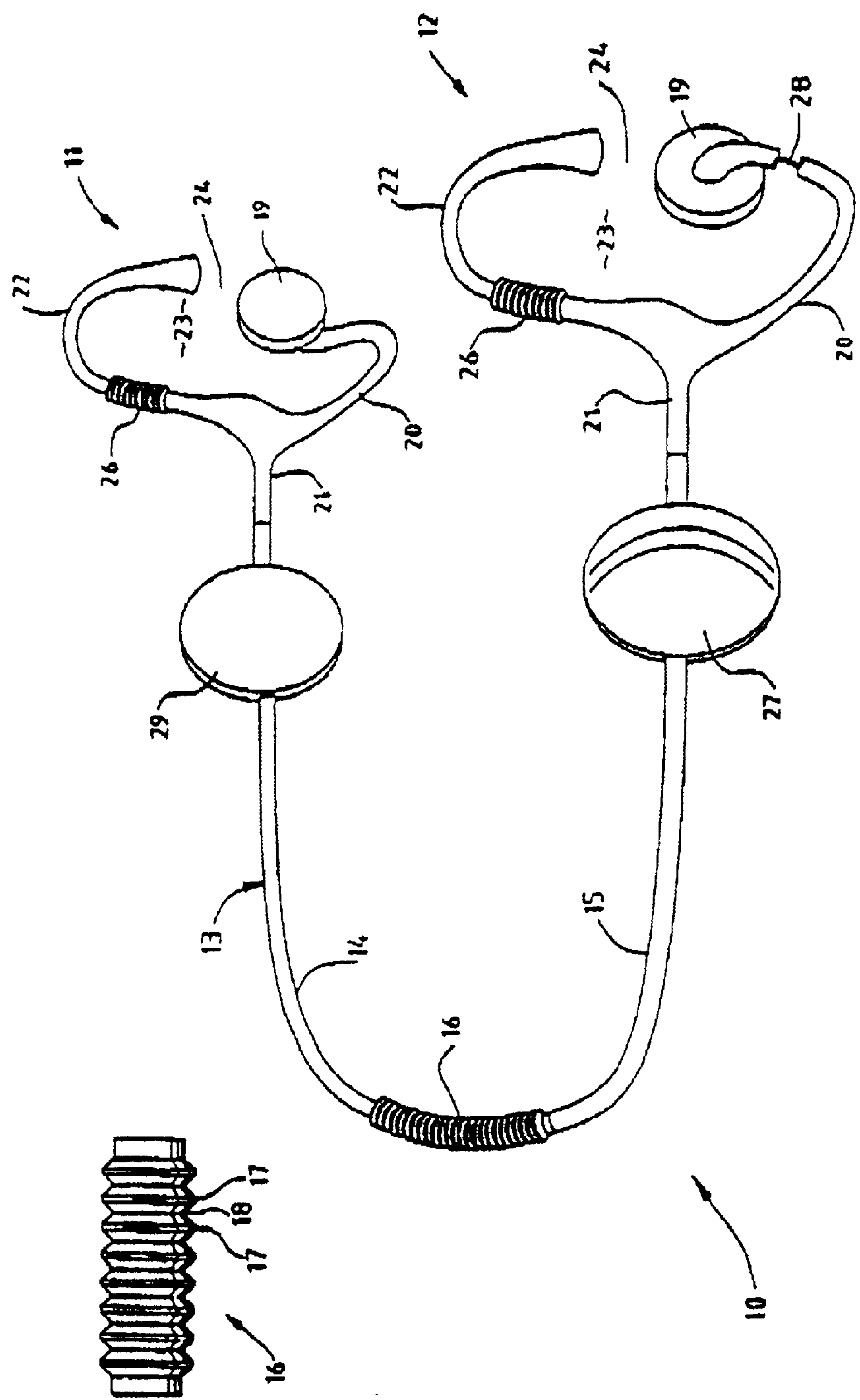
FIG. 1 is a perspective view of a head worn entertainment and communication device according to a first embodiment of the invention.

With reference to FIG. 1 there is shown a swimmers head worn entertainment and communication device 10 comprising, in this instance, a first ear assembly 11 connected in opposed relationship to a second ear assembly 12 by means of interconnect device 13.

The interconnect device 13 comprises a first semi-rigid support 14 connected in opposed relationship to a second semi-rigid support 15 by an adjustable length concertina unit 16 (shown in detail in the insert of FIG. 1).

The semi-rigid supports 13, 15 can take the form of elongate rods made from a plastics material. The adjustable length concertina unit 16 can take the form of a tubular plastics material having hingedly interconnected ferrules adapted to collapse one against the other about hinges 18.

In this instance first ear assembly 11 is constructed in the same manner as second ear assembly 12 and comprises transducer 19 supported on lower limb 20 from a free end 21 of the respective semi-rigid supposes 14, 15.

Each ear assembly 11, 12 further includes an upper limb 22 integrally attached to free end 21 and opposed to lower limb 20 so as to define an ear containing space 23 therebetween.

Figure 2:
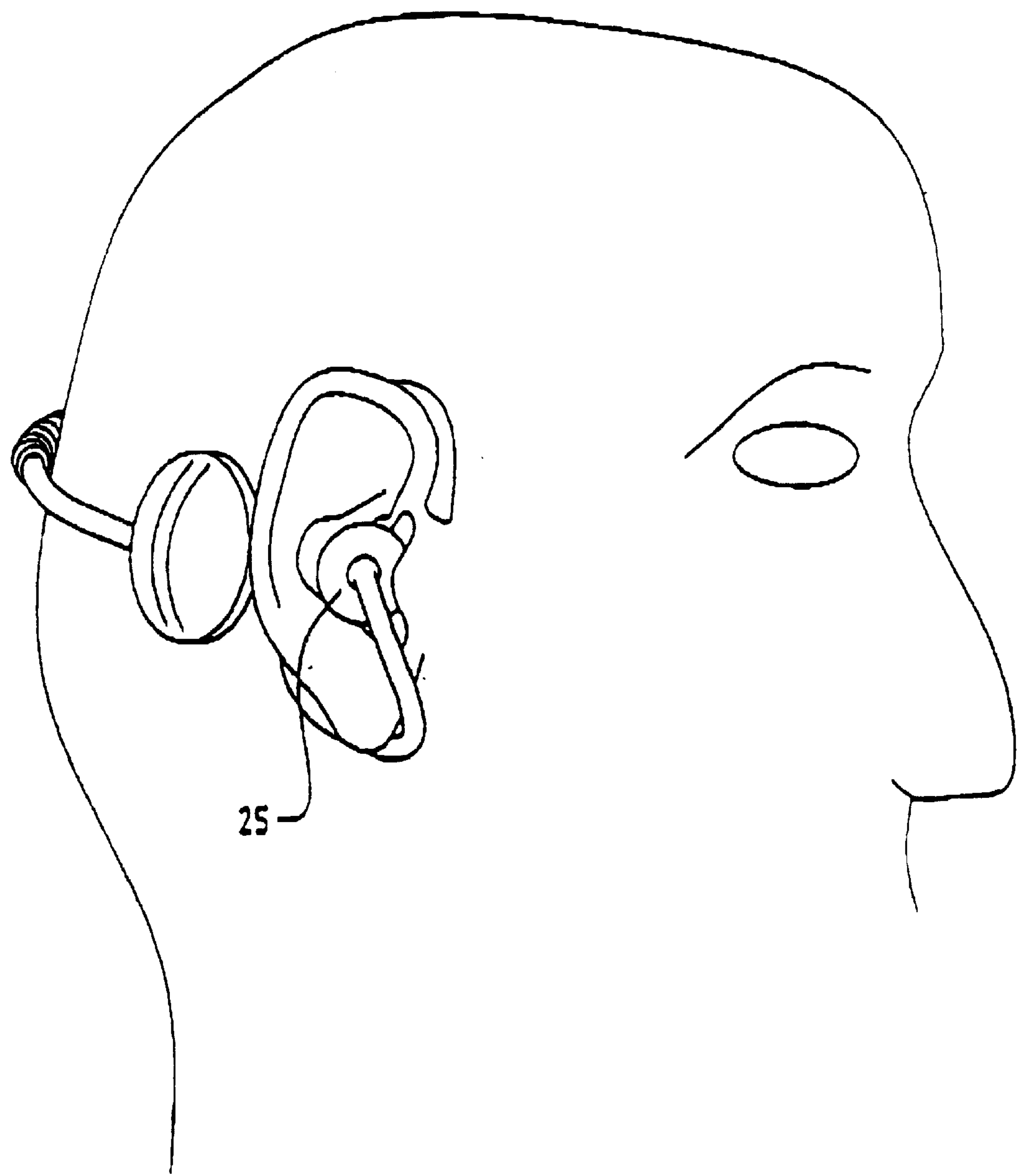
FIG. 2 is a side view of the dice of FIG. 1 in place on a swimmers head.

Both lower limb 20 and upper limb 22 are curved so as to follow at least part of the contour of a human ear as best seen in FIG. 2. They are sufficiently curved that they substantially encircle the ear save for an entry region 24 which presents a sufficient aperture to allow the ear assemblies 11, 12 to be engaged about an ear 25 by a sliding approach of aperture 24 approaching from the rear of the ear.

In this instance the limbs 20, 22 are made from the same plastics material as the semi-rigid supports 14, 15 and are integrally moulded therewith.

The upper and/or lower limb can include an adjustable length concertina unit. In this instance the upper limb 22 is formed of two segments joined by concertina unit 26 thereby allowing adjustment for the ear containing space 23 according to the requirements of the user.

The entertaining and communication device 10 further includes an equipment module 27 threaded onto or formed with second semi-rigid support 15 and similar module 29 threaded onto or formed with first semi-rigid support 14 as shown.

In this instance the equipment module 27 contains an AM and FM radio receiver whose audio out jack is connected by cable 28 to transducer 19, which transducer is shaped to fit snugly into the entry to the auditory canal of a user as best seen in FIG. 2. Equipment module 27 may include an on/off switch and a volume control (not shown).

In this instance the semi-rigid support 14, 15, the lower limbs 20 and the adjustable length concertina unit 16 are hollow and permit cable 28 to be threaded therethrough.

The rigidity of the semi-rigid supports 14, 15 and the concertina unit 16 is selected so that when the ear assemblies 11, 12 are mounted about the ears of a user in opposed relationship they apply a gentle pressure to the head of the user so as to assist retention in place of the entertainment and communication device.

In this instance the second equipment module 29 can contain batteries connected by a cable (not shown) to the radio within module 27.

In use a user turns the radio unit on and selects a radio station and listening volume satisfactory for that user. The user then places the entertainment and communication device about their head as above described and so to achieve the orientation illustrated in FIG. 2.

The user may then laps of a pool of the like whilst listening to the radio, the arrangement being such that relatively little drag is added and, such drag that there is, does not dislodge the entertainment and communication from the head of the wearer.

Figure 3:
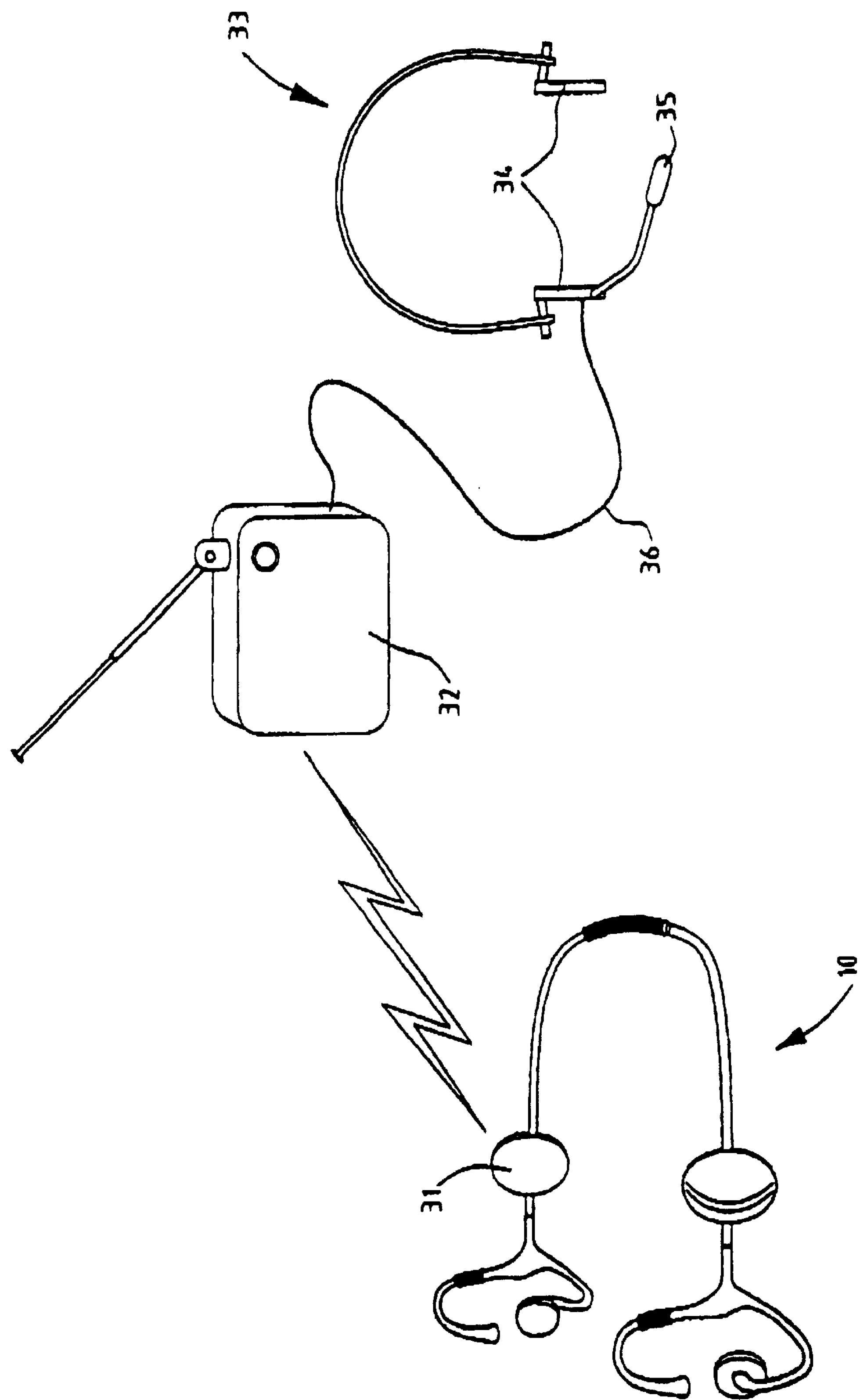
FIG. 3 is a diagrammatic representation of a swimmers head worn entertainment and communication device according to a second embodiment of the invention.

Turning to FIG. 3, a second embodiment of the swimmers head worn entertainment and communication device 30 illustrated comprising, in the instance, the device 10 of FIG. 1 into which has been installed a radio receiver 31 adapted to be in communication with a local transmitter 32. The transmitter 32 is in communication with a head set 33 having ear braces 34 and microphone 35 and connector cable 36 adapted to allow local radio communication with transmitter 32 which, in turn, is in communication with radio receiver 31. With this arrangement a coach or like person can wear headset 33 and have mounted elsewhere on their person the local transmitter 32 and, with this arrangement communicate with device 10 whilst a swimmer is doing laps in a pool.

Alternatively, the unit can be tuned to the frequency of local transmitter 32 for reception of broadcasts from that unit instead.

The arrangement can be such that normally the swimmer will have their unit 31 tuned to a radio station, a transmission from the headset 33 as and when it occurs.

In an alternative embodiment one of either the first ear assembly 11 or second ear assembly 12 can be omitted, but leaving a sufficient stub end at the free end 21 for the purpose of ensuring that it can provide the necessary reactive pressure against the head of a user, equal and opposite to the pressure being applied to the other side of the head of the user by the remaining ear assembly.

In a further alternative embodiment of the invention interconnect device 13 can comprise only the cabling necessary to provide electrical power and communication between the ear assemblies and the radio or like communications device in the equipment module 27.

With reference to the arrangement shown in FIG. 3 input jack 37 to local transmitter 32 can receive audio input from a walkman, CD player or other source of audio input for subsequent communication to the radio receiver 31 of the swimmers head worn entertainment and communication device 10.

Figure 4:
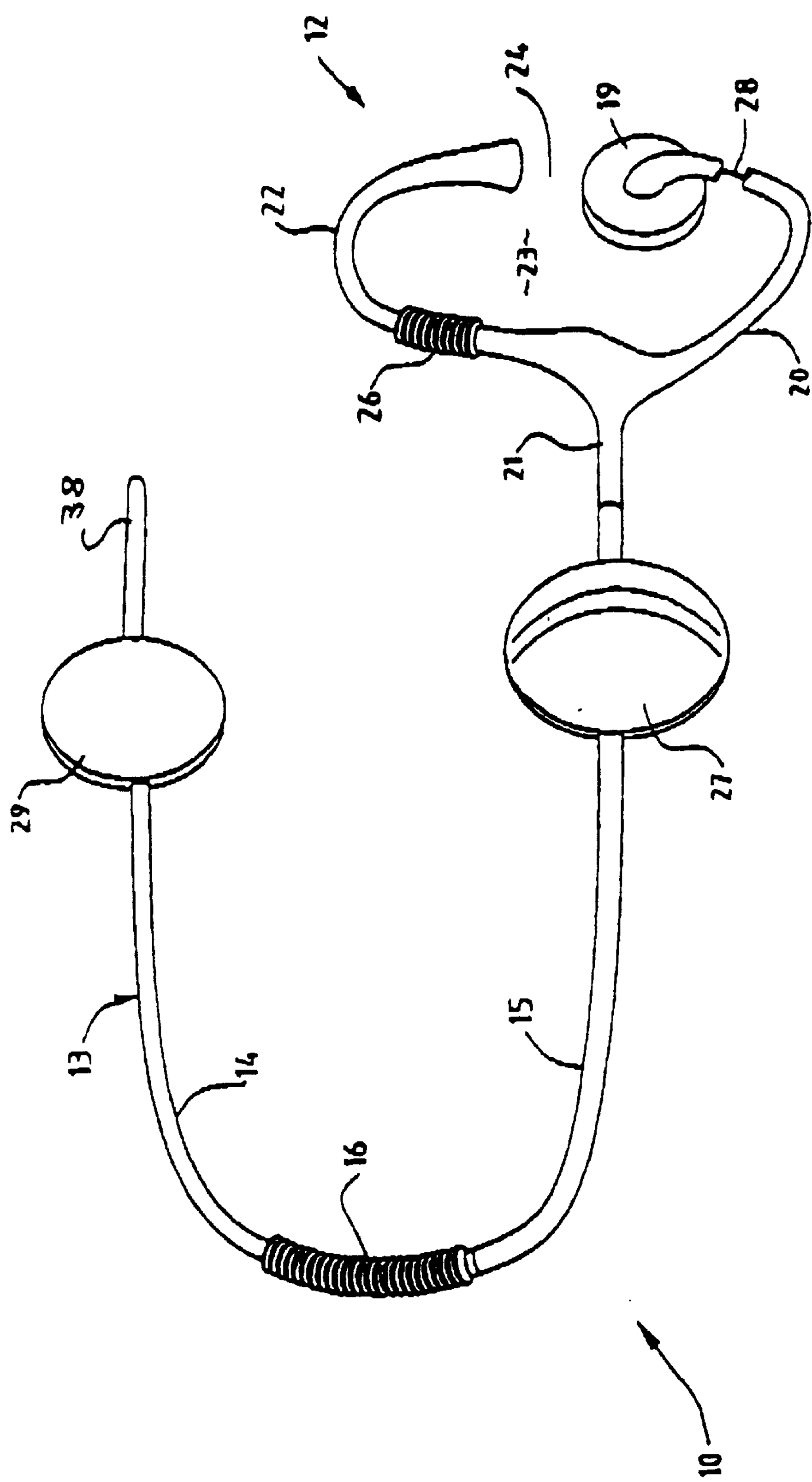
FIG. 4 is a perspective view of a head worn entertainment and communication device according to a third embodiment of the invention.

With reference to FIG. 4 a further embodiment of the invention is illustrated wherein free end 21 of semi rigid support 14 in this instance comprises a stub 38 of a dimension sufficient to permit a user to adjust pressure applied to a users head located between the stub 38 and the ear assembly 12.

Figure 5:
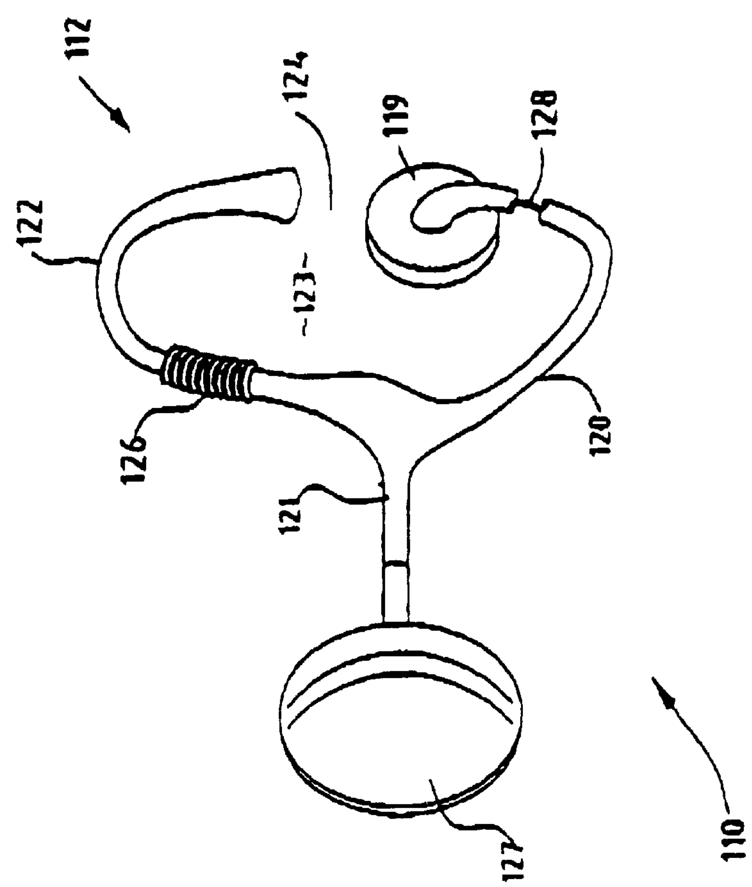
FIG. 5 is a perspective view of a head worn entertainment communication device according to a fourth embodiment of the invention.

FIG. 5 illustrates a further embodiment of the invention in this instance comprising a single ear assembly 112 including a transducer 119 in communication with an equipment module 127 housing a radio receiver (not shown). Component parts are identified by numerals as for earlier embodiments, except that a prefix numeral 1 has been added.

The present invention may be used for a number of on-land and in-water aquatic activities.

The above describes only some embodiments of the present invention and modifications, obvious to those skilled in the art, can be made thereto without departing from the scope and spirit of the present invention.

What is claimed is:

1. A head worn waterproof sound device comprising:

first and second ear assemblies adapted to be attached to the ears of a user, each ear assembly comprising an upper limb adapted to locate about the upper portion of a user's ear and a lower limb adapted to locate about the lower portion of a user's ear;

a pair of transducers, the transducers being respectively mounted to the two ear assemblies and adapted to be respectively located within or adjacent to the user's ears;

a resilient interconnect device connected to the two ear assemblies, the interconnect device adapted to be adjustably mounted to a user's head such that the two ear assemblies connect to the user's ears in use;

a waterproof equipment module means mounted to the interconnect device, the equipment module means housing a radio receiver in communication with the transducers, the radio receiver being adapted to receive radio signals from a radio signal transmitter located remotely from the device, the equipment module means also housing a power source adapted to power the radio receiver in use.

2. A device as claimed in claim 1, wherein the interconnect device includes an adjustable length means to adjust the length of the interconnect device to fittingly adjust to a users head in use.

3. A device as claimed in claim 2, wherein the adjustable length means includes an adjustable length concertina tube.

4. A device as claimed in any one claims 1 to 3, wherein the ear assemblies include adjustable length means to adjust the space between the upper limb and the lower limb to fittingly adjust the ear assembly to a users ear in use.

5. A device as claimed in any one of claims 1 to 3, wherein the waterproof equipment module means comprises first and second waterproof equipment modules that are generally opposed to each other and wherein the first and second waterproof equipment modules respectively house the radio receiver and the power source.

6. A device as claimed in any one of claims 1 to 3, wherein the power source includes on or more batteries.

7. A device as claimed in claim 4, wherein the ear assembly adjustable length means includes a concertina tube.

8. A device as claimed in claim 5, wherein the ear assembly adjustable length means includes a concertina tube.

9. A device as claimed in claim 6, wherein the ear assembly adjustable length means includes a concertina tube.

10. A device as claimed in any one of claims 1–3, wherein the transducer is positioned within an ear plug that fits within the ear canal of a user in use.

11. A device as claimed in claim 4, wherein the transducer is positioned within an ear plug that fits within the ear canal of a user in use.

12. A device as claimed in claim 5, wherein the transducer is positioned within an ear plug that fits within the ear canal of a user in use.

13. A device as claimed in claim 6, wherein the transducer is positioned within a ear plug that fits within the ear canal of a user in use.

14. A device as claimed in claim 7, wherein the transducer is positioned within an ear plug that fits within the ear canal of a user in use.

15. A device as claimed in any one of claims 1–3, wherein the equipment module means includes an on/off switch for switching the radio receiver on or off.

16. A device as claimed in claim 4, wherein the equipment module means includes an on/off switch for switching the radio receiver on or off.

17. A device as claimed in claim 5, wherein the equipment module means includes an on/off switch for switching the radio receiver on or off.

18. A device as claimed in claim 6, wherein the equipment module means includes an on/off switch for switching the radio receiver on or off.

19. A device as claimed in claim 7, wherein the equipment module means includes an on/off switch for switching the radio receiver on or off.

20. A device as claimed in claim 8, wherein the equipment module means includes an on/off switch for switching the radio receiver on or off.

21. A device as claimed in claim 6, wherein the equipment module means includes a removable cover to enable changing of the one or more batteries.

22. A device as claimed in claim 9, wherein the equipment module means includes a removable cover to enable changing of the one or more batteries.

23. A device as claimed in claim 13, wherein the equipment module means includes a removable cover to enable changing of the one or more batteries.

24. A device as claimed in claim 18, wherein the equipment module means includes a removable cover to enable changing of the one or more batteries.

25. A device as claimed in claims 1–3, wherein the device further comprises a volume switch for controlling the volume of the auditory signal.

26. A communication system comprising:

a radio transmitter adapted to transmit a radio signal to a head worn waterproof sound device, the head worn waterproof sound device comprising:

first and second ear assemblies adapted to be attached to the ears of a user, each ear assembly comprising an upper limb adapted to located about the upper portion of a user's ear and a lower limb adapted to locate about the lower portion of a user's ear;

a pair of transducers, the transducers being respectively mounted to the two ear assemblies and adapted to be respectively located within or adjacent to the user's ears;

a resilient interconnect device connected to the two ear assemblies, the interconnect device adapted to be adjustably mounted to a user's head such that the two ear assemblies connect to the user's ears in use;

a waterproof equipment module means mounted to the interconnect device, the equipment module means housing a radio receiver in communication with the transducers, the radio receiver being adapted to receive radio signals from the radio signal transmitter when the radio signal transmitter is located remotely from the device, the equipment module means also housing a power source adapted to power the radio receiver in use.

27. A communication system according to claim 26, wherein the interconnect device includes an adjustable length means to adjust the length of the interconnect device to fittingly adjust to a users head in use.

28. A communication system according to claim 27, wherein the adjustable length means includes an adjustable length concertina tube.

* * * * *